(12) United States Patent
Chang et al.

(10) Patent No.: US 6,338,128 B1
(45) Date of Patent: Jan. 8, 2002

(54) SYSTEM AND METHOD FOR INVALIDATING AN ENTRY IN A TRANSLATION UNIT

(75) Inventors: Albert Chang, Yorktown Heights, NY (US); Edward John Silha, Austin, TX (US); Larry Edward Thatcher, Austin, TX (US); Gus Wai-Yan Yeung, Austin, TX (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/315,543

(22) Filed: May 20, 1999

(51) Int. Cl.[7] .......................... G06F 12/00; G06F 12/10
(52) U.S. Cl. ..................... 711/203; 711/133; 711/200; 711/205
(58) Field of Search ................... 711/100, 133, 711/154, 202, 203, 205, 200

(56) References Cited

U.S. PATENT DOCUMENTS

| | | | | |
|---|---|---|---|---|
| 5,530,824 A | * | 6/1996 | Peng et al. | 711/207 |
| 5,535,351 A | * | 7/1996 | Peng | 711/207 |
| 5,604,879 A | * | 2/1997 | Beavers et al. | 711/207 |
| 5,682,495 A | * | 10/1997 | Beavers et al. | 711/207 |
| 5,781,750 A | * | 7/1998 | Blomgren et al. | 712/209 |
| 5,930,832 A | * | 7/1999 | Heaslip et al. | 711/207 |
| 6,021,481 A | * | 2/2000 | Eickemeyer et al. | 711/207 |
| 6,044,447 A | * | 3/2000 | Averill et al. | 711/207 |
| 6,049,867 A | * | 4/2000 | Eickemeyer et al. | 712/228 |
| 6,175,898 B1 | * | 1/2001 | Ahmed et al. | 711/137 |

* cited by examiner

*Primary Examiner*—Tuan V. Thai
(74) *Attorney, Agent, or Firm*—Kelly K. Kordzik; Winstead Sechrest & Minick P.C.; Anthony V. S. England

(57) ABSTRACT

As a program is replaced by the operating system running within a microprocessor, only those entries associated with the replaced program and resident within effective-to-real address translation units will be replaced. Those entries within the effective-to-real address translation units associated with the operating system and shared libraries, and any other software units operating within the microprocessor will not be invalidated.

6 Claims, 4 Drawing Sheets

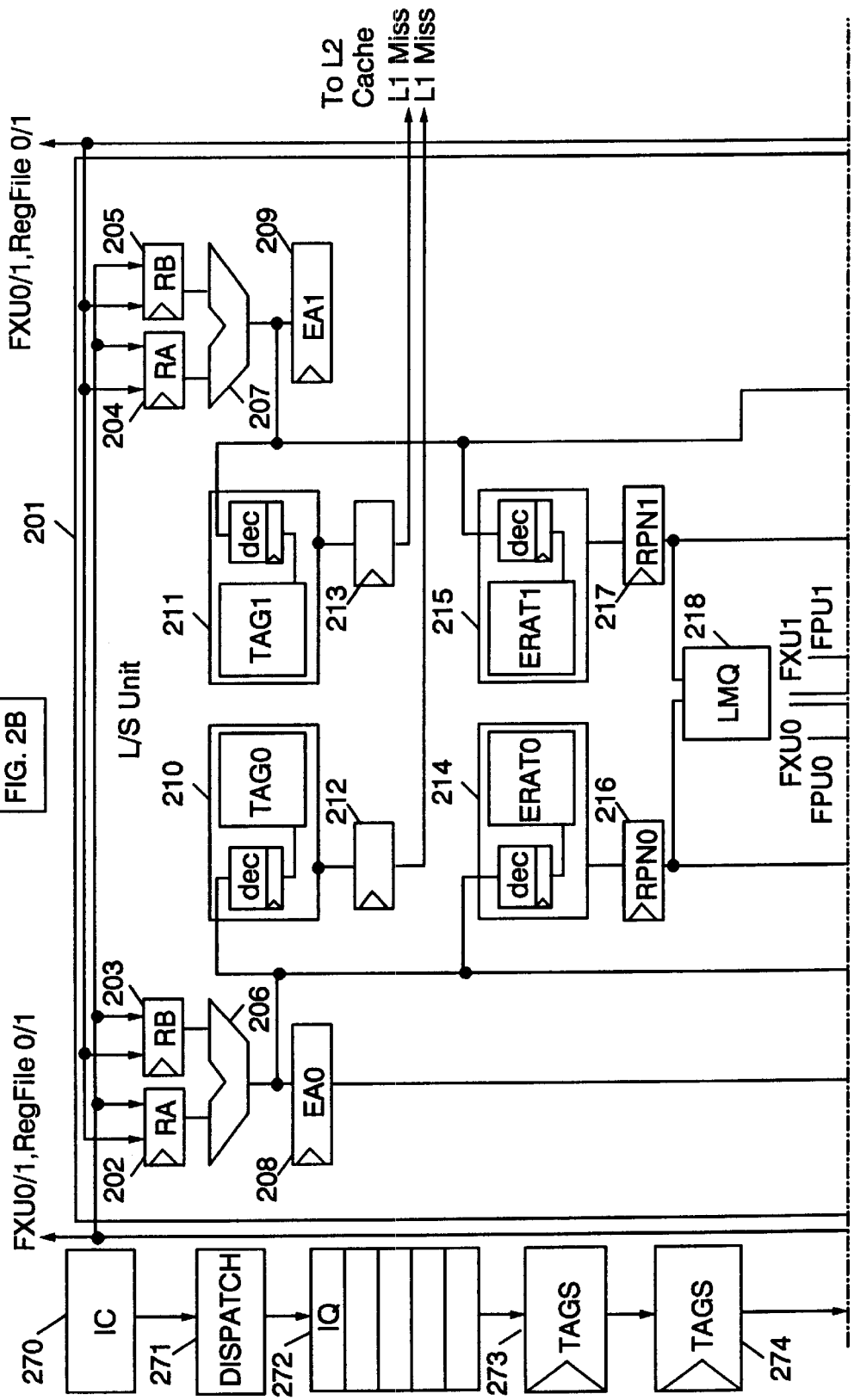

SYSTEM AND METHOD FOR INVALIDATING AN ENTRY IN A TRANSLATION UNIT

TECHNICAL FIELD

The present invention relates in general to data processing systems, and in particular, to the translations of addresses in a processor.

BACKGROUND INFORMATION

Data processing systems employ operating systems ("OS's") capable of running several individual programs concurrently. These programs are often run using virtual addressing. The reasons for using virtual addressing (e.g., efficient use of real memory) are well known in the art.

In such a system, each program has access to the full 64-bit effective address (EA) space, and the virtual address (VA) space must be larger (e.g., 80 bits) so the operating system can allocate separate regions of the virtual address space to each program. The operating system normally associates some regions of this 64-bit effective address space with private virtual address space regions for exclusive use by a program when the program is started. None of these regions are accessible to a second program. Other regions of this effective address space are associated with shared virtual address space regions that are accessible to some or all other programs. These shared regions normally contain parts of the operating system and subroutine libraries.

When a load or store instruction is executed, or an instruction is to be fetched, the effective address must be translated to a virtual address and then to a real address (RA) before memory can be accessed. Translating the effective address to a virtual address is often performed using a segment-lookaside-buffer (SLB) or a segment register, the content of which replace some of the high-order bits of the effective address. The resulting virtual address is subsequently translated to a real address by the processor when it searches the translation-lookaside-buffer (TLB) or the page table. The TLB is a cache of the content of page table entries that have been used recently to translate virtual addresses.

As a result of the increase of the frequencies at which processors run and the growth in size of TLB arrays, performing the two step process of address translation can significantly reduce the performance of the processor. To reduce the performance penalty associated with address translation, the processor uses one or more lookaside-buffer mechanisms (ERATs) to translate effective addresses directly to real addresses. These arrays are caches that contain the results of recent translations of effective addresses to real addresses. Because ERAT arrays are smaller than TLB arrays, they are faster and the use of ERAT arrays avoids the intermediate translation step.

Referring to FIG. 4, when a program 403 is executed, program 403 will occupy only a subset of the memory space allocated by the OS 401. Additionally, common libraries 402 used by a plurality of programs 403 will also require a certain amount of the memory space. When a new program is loaded, the contents of some SLB entries are altered. This will change the relationship between the effective addresses and the virtual addresses. Consequently, the effective address to real address translations associated with the replaced program within the ERATs become stale. When such a change in the entries in the SLB occur, there is no way to find the exact corresponding entries within the ERATs. Thus, the prior art has simply invalidated all of the ERATs' entries. The problem with such a solution is that there may be entries within the ERATs that pertain solely to the OS 401 or the common libraries 402. If all the entries in the ERATs are invalidated, then those entries pertaining to the OS 401 and the libraries 402 are also invalidated. This can harm the efficiency and the speed of the microprocessor, because now new entries pertaining to the OS 401 and the libraries 402 will have to be entered into the ERATs, instead of the microprocessor being able to continue using the previous entries.

Therefore, there is needed in the art a system and method for invalidating a subset of ERAT entries.

SUMMARY OF THE INVENTION

The present invention addresses the foregoing need by providing a system and method for selectively invalidating a subset of the ERAT in load/store and instruction fetching units of a microprocessor. One or more Class bits are associated with each entry in the segment lookaside buffer. Then, when such an entry in the SLB is invalidated, a message is sent to the ERAT to selectively invalidate any corresponding entries therein. This may be performed by using a CAM compare of the received Class bit(s) with entries in the ERAT.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
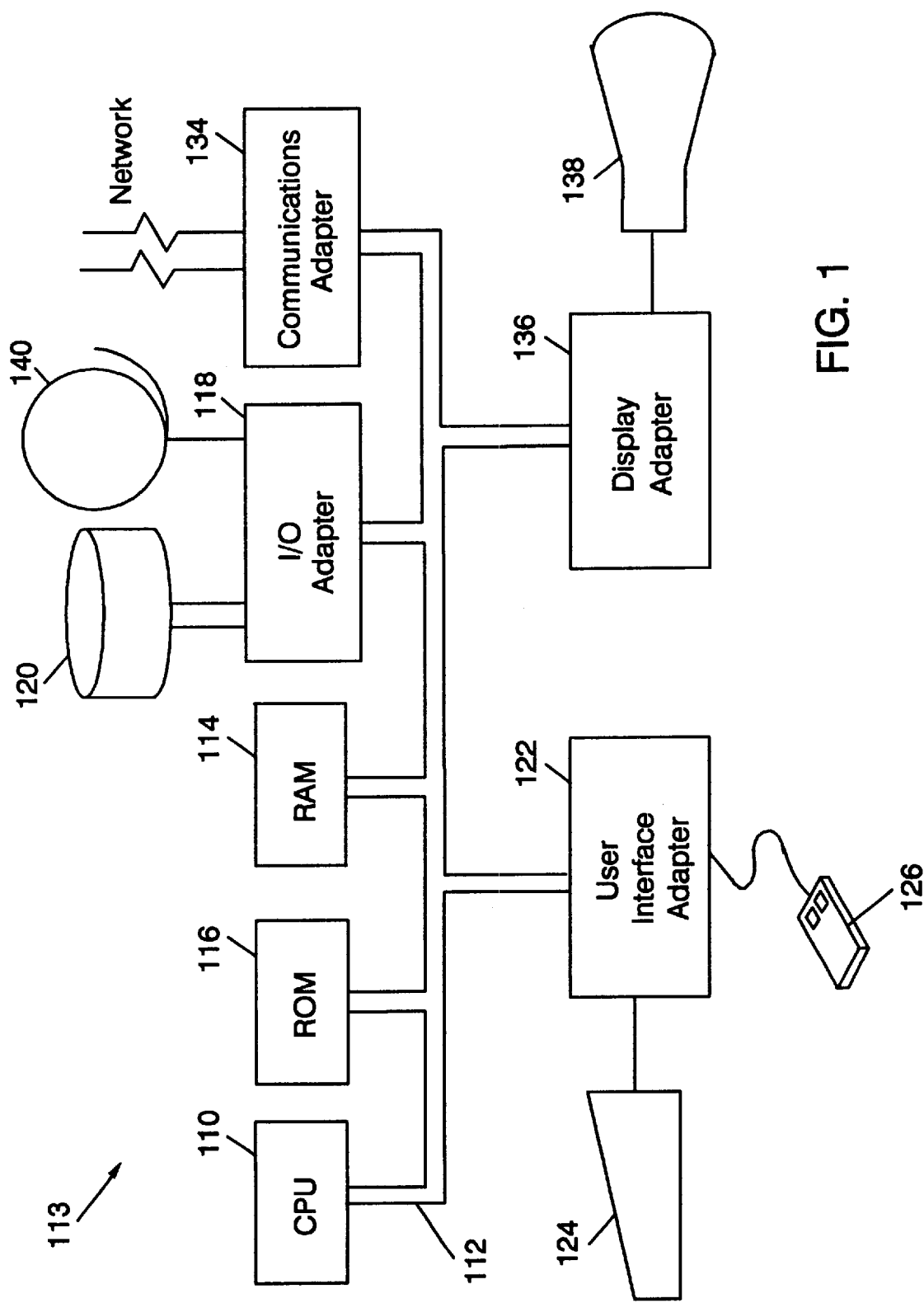
FIG. 1 illustrates a data processing system configured in accordance with the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

A representative hardware environment for practicing the present invention is depicted in FIG. 1, which illustrates a typical hardware configuration of workstation 113 in accordance with the subject invention having central processing unit (CPU) 110, and a number of other units interconnected via system bus 112. CPU 110 embodies the load/store unit 201 of the present invention as described below. Workstation 113 includes random access memory (RAM) 114, read only memory (ROM) 116, and input/output (I/O) adapter 118 for connecting peripheral devices such as disk units 120 and tape drives 140 to bus 112, user interface adapter 122 for connecting keyboard 124, mouse 126, and/or other user interface devices such as a touch screen device (not shown) to bus 112, communication adapter 134 for connecting workstation 113 to a data processing network, and display adapter 136 for connecting bus 112 to display device 138. CPU 110 may include other circuitry (other than load/store unit 201) not shown herein, which will include circuitry commonly found within a microprocessor, e.g., execution unit, bus interface unit, arithmetic logic unit, etc. CPU 110 may also reside on a single integrated circuit.

Figure 2B:
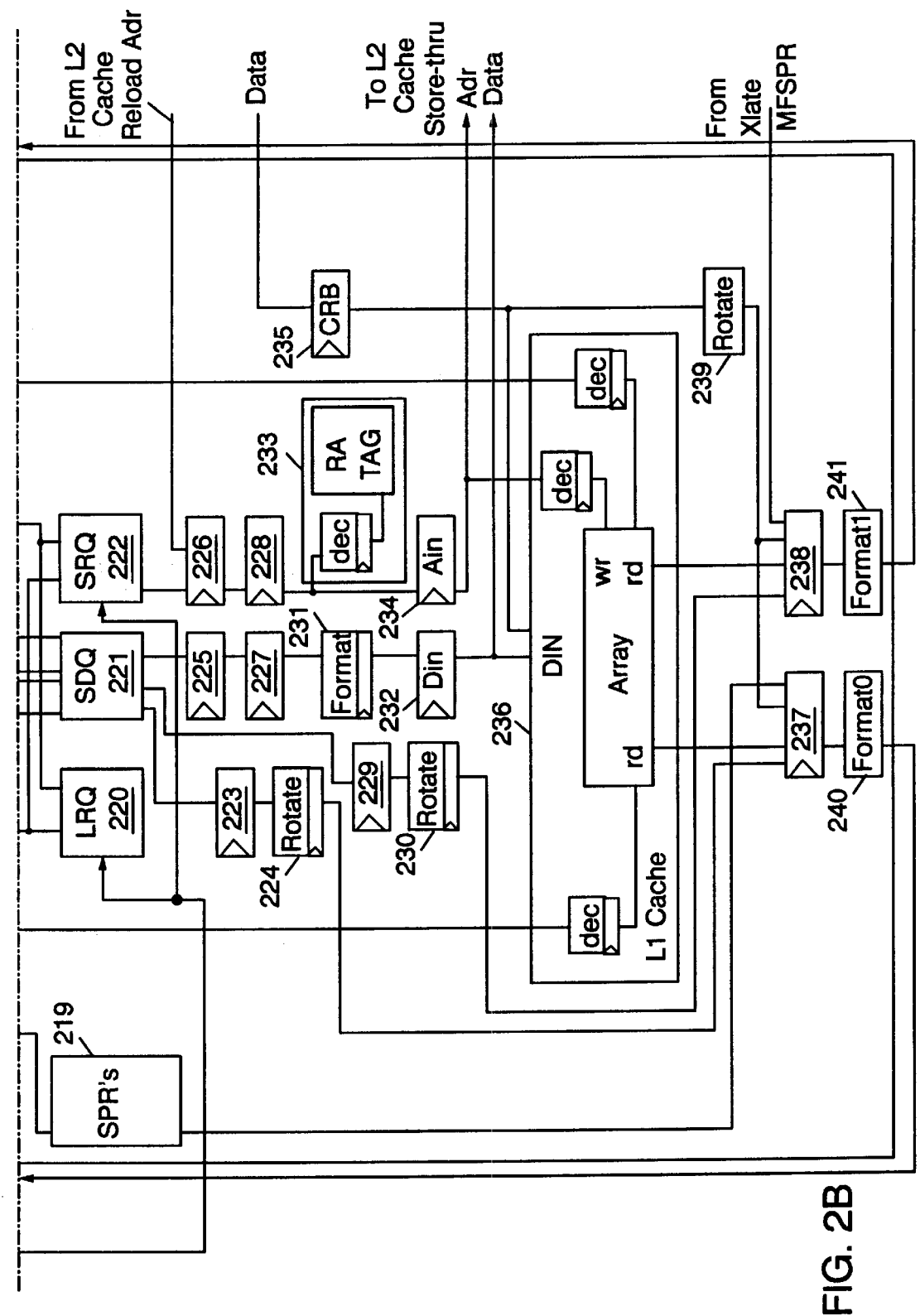
FIG. 2 illustrates a load/store unit configured in accordance with the present invention.

FIG. 2 illustrates load/store (L/S) unit 201 configured in accordance with the present invention. L/S unit 201 is located within CPU 110, which may be configured in accordance with typical microprocessor architectures.

L/S unit 201 has two pipelines so that two load or store instructions can be issued per machine cycle. Registers 202–205 receive operands from fixed point units (FXUs) 0 and 1 (not shown) in a manner well-known in the art. 64-bit adder 206 adds operands received from registers 202 and 203, while 64-bit adder 207 adds operands from registers 204 and 205 to produce a pair of 64-bit effective addresses. These effective addresses are outputted to registers 208 and 209, respectively. Registers 208 and 209 capture the effective addresses (EA). They then both feed LMQ 218, LRQ 220 and SRQ 222, which all need a portion of the EA in addition to the real address (RA) from registers 216 and 217 to perform address checking. Additionally, the effective addresses are decoded to access tag arrays 210 and 211 to determine if there is a hit or a miss within L1 cache 236. If there is a miss, then the addresses are passed through registers 212 and 213 and sent to the L2 cache (not shown).

Furthermore, the effective addresses are sent from adders 206 and 207 to be decoded and to access the effective real address translator (ERAT) arrays 214 and 215, respectively, which output translated addresses through registers 216 and 217.

Further, the effective addresses from adders 206 and 207 access the L1 cache 236 for the load operation after being decoded by the decoders within the L1 cache 236. If there is a hit in the L1 cache 236, then the data is read out of the L1 cache 236 into registers 237, 238, and formatted by formatters 240, 241, and returned on the result bus to be sent to a register file (RegFile) (not shown). The cache line read out of L1 cache 236 is also returned into the registers 202–205 for operations that are dependent on the result as an operand.

Essentially, the three cycles performed within L/S unit 201 are the execute cycle (where the addition is performed), the access cycle (where access to the arrays is performed), and the result cycle (where the formatting and forwarding of data is performed).

If there is a miss in the cache, the request is then sent down to the L2 cache (not shown). The load miss queue (LMQ) 218 waits for the load data to come back from the L2 cache (not shown). The data associated with that cache line is loaded into the L1 cache 236.

These load operations can be performed speculatively and out of order. Store instructions are also executed out of order. Store instructions are run through the translation operation in translators 214, 215, then inserted into the store data queue (SDQ) 221 for storage into the L1 cache 236 after the instructions have been completed. Therefore, store instructions are executed out of order, but written into the L1 cache 236 in order.

The store reorder queue (SRQ) 222 keeps track of store instructions that have been executed. SRQ 222 maintains the store instructions in the queue and determines when the data is available in the store data queue (SDQ) 221 and when the store instruction is next to complete. The store to the L1 cache 236 is then completed.

Many of the registers 223, 225–229, and 237–238 are utilized for timing.

Cache lines within the L1 cache 236 are accessed based on the effective address of the cache line. The RA tag array 233 keeps track of where in the L1 cache 236 a cache line was written. The format block 231 takes the data from the SDQ 221 and rotates it properly to write into the correct byte positions in the L1 cache 236 upon execution of the store instruction. Rotate blocks 224 and 230 are utilized for store forwarding. Therefore, if there is a store instruction that is sitting in the store queue and has not been written into the queue yet because it is not next to complete, and then a younger load instruction is received that needs that data, the data will be forwarded to the load instruction being executed.

Rotate block 239 is utilized to rotate data received from the L2 cache (not shown) in response to an L1 cache miss, for forwarding the data from the L2 cache on to the result bus for forwarding to the proper register file.

Block 219 contains a number of special purpose registers to store data as a result of special purpose register instructions and read data from these registers so they get into the normal pipeline. These SPRs contain information such as error status, error location in main memory, and other LSU configuration information.

Register 235 is implemented for timing purposes to stage data from the L2 cache (not shown). Format blocks 240 and 241 format (or shift) cache data into the proper byte positions for the load result to the register file.

Figure 3:
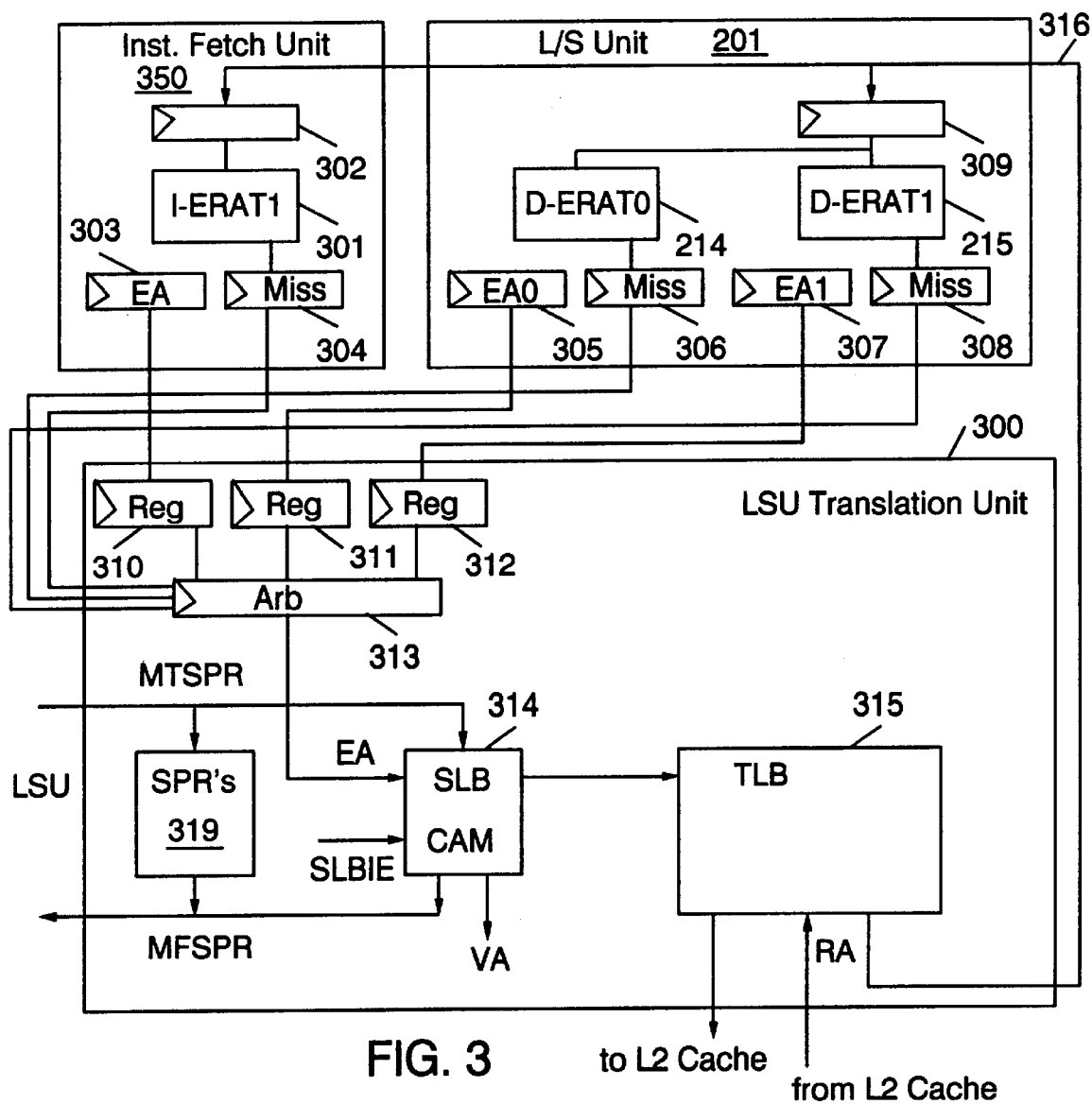
FIG. 3 illustrates a translation unit.
Figure 4:
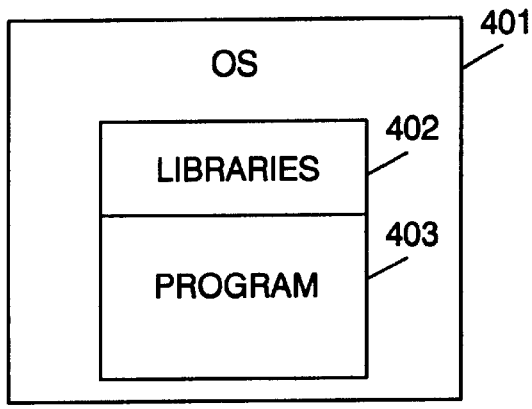
FIG. 4 illustrates memory space allocation between an operating system, common (shared) libraries, and a program.

Referring next to FIG. 3, there is illustrated a portion of instruction fetch unit 350, load/store ("L/S") unit 201 and LSU translation unit 300. Instruction fetch unit 350 is implemented as part of CPU 110. Note that LSU translation unit 300 may be physically implemented coextensively with LSU 201. Shown are those portions of LSU 201 pertaining to the data ERATs 214 (D-ERAT0) and 215 (D-ERAT1). An instruction ERAT 301 (I-ERAT1) in instruction fetch unit 305 is also illustrated. Miss request registers 304, 306, and 308 validate the EAs in registers 303, 305, and 307 to the LSU translation unit 300 arbitration register 313. Registers 303, 305, and 307 provide the effective addresses received by units 350 and 201 to registers 310–312 within LSU translation unit 300. An arbitration register 313 selects one of these addresses to forward to SLB 314, which may be implemented as a CAM. The SLB can be viewed as a set of registers, the content of which are altered by executing an instruction designed explicitly for that purpose. It is also possible to have software place the segment translation information in a memory resident table, which the processor would search when necessary. In such an implementation, the processor also contains an SLB that it used to cache the most recent segment translations. Software does not write the content of the SLB directly but does invalidate entries when necessary. The SPRs 319 contain CPU control information. The translation unit SPRs contain information on how to translate, such as page table location in main memory, size of page tables, and other needed translation information.

As discussed above, the operating system ("OS") 401 executing within CPU 110, will typically allocate private regions of the virtual address space to each of a multiplicity of programs that can concurrently occupy real memory. In addition, the common programs and libraries also occupy real memory, being allocated regions of the virtual address space disjoint from the private regions allocated to programs. To support this model, the virtual address space is larger than the effective address space. When a particular program is suspended from executing on CPU 110, the private virtual address regions allocated to the program are preserved until the program is dispatched again. It is only when the program completes or is terminated that the private virtual address regions allocated to the program are released. Because the TLB arrays contain virtual to real translations and the private regions allocated to programs are disjoint, the TLB is not invalidated when one program is suspended and a second begins executing on the CPU 110.

As a program executes, there will typically be a need to load and store data from the memory subsystem. It is at this time when translations are needed from the effective address used within CPU 110 to a virtual address by the SLB 314, which is then translated into a real address by a translation lookaside buffer ("TLB") 315. There may also be a page table in memory to translate virtual addresses to real addresses. Therefore, if a translation is not resident within the TLB 315, then the translation will go to the page table. After the page table translation is performed, then that translation will be written into the TLB 315. Note, however, the process implemented within LSU translation unit 300 is relatively slow. As a result, the smaller and faster ERATs 214 and 215 are implemented within LSU 201 to perform faster effective-to-real address translations. CPU 110 translates an effective address to a real address using the ERAT arrays if the arrays contain the needed translation. Otherwise, the CPU 110 uses the segment translation mechanism, the TLB, and the page table to translate an effective address to a real address, caching the result of the translation in the appropriate ERAT arrays. As described earlier, the contents of the ERAT arrays can be accessed in less time than the contents of the much larger TLB arrays. Furthermore, using the ERAT arrays avoids the need to perform the intermediate translation from effective address to virtual address which would add additional time to the translation process.

The translation unit is started on an ERAT miss and the result is a reload of the ERAT. On an ERAT miss, the translation unit performs a translation which normally only requires a SLB/TLB lookup to reload the ERAT. On a TLB miss, the page tables are accessed to reload the TLB.

An example will illustrate how the foregoing units operate, and how the present invention overcomes a problem with the prior art. Assume that a particular program 403 is being run within operating system 401. If the program performs a load operation, whereby a particular data value is to be loaded into a register, if there is an entry within one of the ERATs 214, 215 matching the effective address of the load operation, then one of the ERATs 214, 215 will perform the effective-to-real address translation for the load operation. The SLB/TLB/page_table translation may begin in parallel with the ERAT array search or may be begun only if the ERAT array did not contain the needed translation.

Now assume that a new program is loaded into the operating system 401. This will require that new entries be allocated within SLB 314, changing the relationship between the effective addresses and the virtual addresses previously set forth in SLB 314. The effective address to real address translation entries within the ERATs 301, 214, 215 pertaining to the replaced program are stale. Concurrently, with the program change, an SLB invalidate signal SLBIE will be received by SLB 314 to invalidate all of the SLB entries 314. In the prior art, there was no way of selectively invalidating entries within the ERATs. Therefore, all of the entries within the ERATs were invalidated correspondingly. However, as previously described, there may be entries within the ERATs that do not pertain solely to the replaced program 403, but pertain to shared libraries 402, or even the operating system 401. With the prior art, these entries were invalidated and no longer usable. The present invention provides for a means to keep these other ERAT entries valid.

Figure 5:
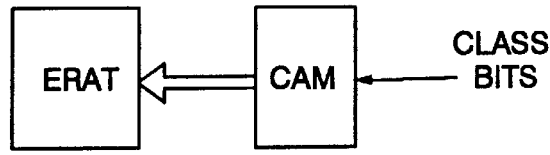
FIG. 5 illustrates an embodiment for selectively invalidating entries in an ERAT.

The present invention has implemented this unique feature through one or more Class bits associated with each entry in the SLB 314. As the SLBIE signal is received by SLB 314, one or more entries within the SLB 314 are noted as invalid (the valid bit is cleared). In addition, the Class bits specified by the SLBIE signal are sent to the ERATs 301, 214, 215. A comparison is then made of the Class bits with Class bits associated with entries in the ERATs 301, 214, and 215. This can be performed using a CAM compare as illustrated in FIG. 5. For any matches that occur, the corresponding entries within the ERATs 301, 214, 215 are invalidated (a Valid bit is flipped using well known circuitry). Entries not matching the Class bits are not invalidated, and will thus remain within the ERATs 301, 214, and 215 in a valid condition.

The Class bits may be one or more bits. They can be determined by what part of the effective address space the SLB entries are allocated, or they can be determined when a call is executed to create the SLB entries. Essentially, different Class bits can be associated with the OS 401, the shared libraries 402, and the resident program 403. When the translation of an effective address is not contained within the appropriate ERAT array, the translation is determined using the segment translation mechanism, the TLB, and possibly the page table. When the translation has been determined, the translation is loaded into the appropriate ERAT entry (it is cached). The information cached includes the effective address of the virtual page, the real address of the associated real memory page, protection bits, and the Class bits copied from the SLB entry that translated the effective address. When a program is replaced, then only those entries within the ERATs 301, 214, 215 having the same Class bits as the Class bits of the replaced program will be invalidated.

Although the present invention and its advantages have been described in detail, it should be understood that various changes, substitutions and alterations can be made herein without departing from the spirit and scope of the invention as defined by the appended claims.

What is claimed is:

1. A processor comprising:
   an effective address to real address translation unit;
   circuitry for selectively invalidating entries in the effective address to real address translation unit, wherein the invalidating circuitry is operable for invalidating less than all of the entries in the effective address to real address translation unit, wherein the invalidating circuitry further comprises:
   one or more class bits associated with each of the entries in the effective address to real address translation units; and circuitry for invalidating only those entries in the effective address to real address translation unit having selected class bits;

a segment lookaside buffer having entries operable for translating effective addresses pertaining to a program being executed by the processor to virtual addresses;

a particular set of one or more class bits assigned to the entries in the segment lookaside buffer;

circuitry for invalidating the entries in the segment lookaside buffer;

circuitry for comparing the particular set of one or more class bits to the one or more class bits associated with each of the entries in the effective address to real address translation unit; and circuitry for invalidating only those ones of the entries in the effective address to real address translation unit having one or more class bits matching the particular set of one or more class bits assigned to the entries in the segment lookaside buffer.

2. The processor as recited in claim 1, wherein the effective address to real address translation unit resides in a load/store unit in the processor.

3. The processor as recited in claim 2, wherein entries in the segment lookaside buffer are invalidated when a different program is dispatched to execute on the processor or an operating system has altered the effective to virtual address mapping.

4. A method performed in a processor, comprising the steps of:

translating effective addresses to real addresses in an effective address to real address translation unit; and selectively invalidating particular ones of entries in the effective address to real address translation unit, wherein the selectively invalidating step further comprises the step of invalidating less than all of the entries in the effective address to real address translation unit, wherein the selectively invalidating step further comprises the steps of:

in a segment lookaside buffer, translating effective addresses pertaining to a program being executed by the processor to virtual addresses pertaining to a program being executed by the processor to virtual addresses;

assigning a particular set of one or more class bits to entries in the segment lookaside buffer performing the translating steps;

invalidating the entries in the segment lookaside buffer;

comparing the particular set of one or more class bits to one or more class bits associated with each of the entries in the effective address to real address translation unit; and invalidating only those ones of the entries in the effective address to real address translation unit having one or more class bits matching the particular set of one or more class bits assigned to the entries in the segment lookaside buffer.

5. A data processing system comprising:

a processor;

a memory subsystem;

an input device;

an output device;

a bus system coupling the processor to the memory subsystem, the input device, and the output device, wherein the processor further comprises:

a load/store unit having an effective address to real address translation unit with a plurality of entries operable for translating effective addresses to real addresses;

circuitry for selectively invalidating the entries in the effective address to real address translation unit;

a segment lookaside buffer having entries operable for translating effective addresses pertaining to a program being executed by the processor to virtual addresses;

a particular set of one or more class bits assigned to the entries in the segment lookaside buffer;

circuitry for invalidating the entries in the segment lookaside buffer;

circuitry for comparing the particular set of one or more class bits to the one or more class bits associated with each of the entries in the effective address to real address translation unit; and circuitry for invalidating only those ones of the entries in the effective address to real address translation unit having one or more class bits matching the particular set of one or more class bits assigned to the entries in the segment lookaside buffer.

6. The data processing system as recited in claim 5, wherein entries in the segment lookaside buffer are invalidated when a different program is dispatched to execute on the processor or an operating system has altered the effective to virtual address mapping.

* * * * *